April 2, 1929.   A. S. MESEROLL   1,707,530
UNIVERSAL COUPLING
Filed April 15, 1924
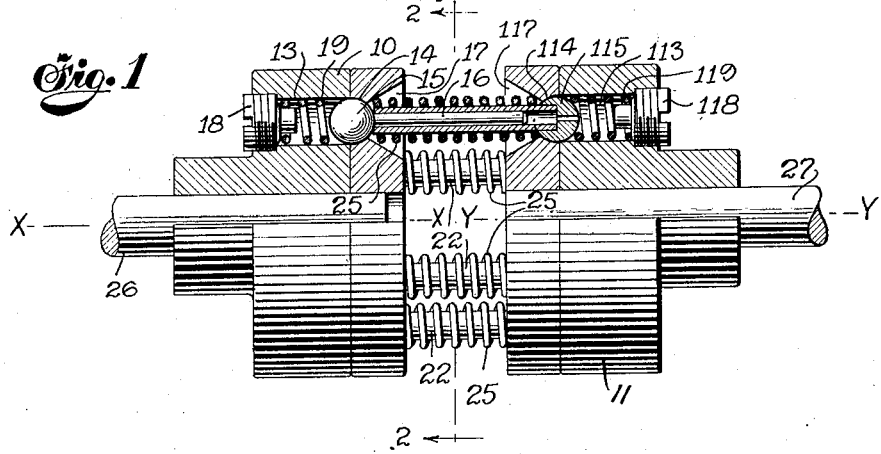
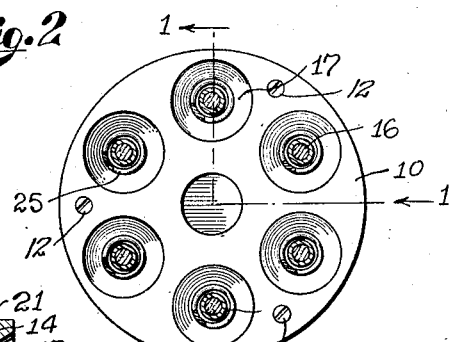
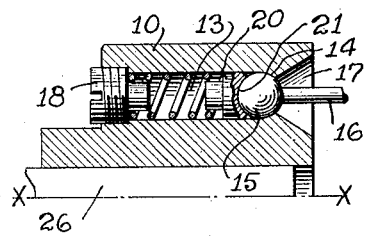
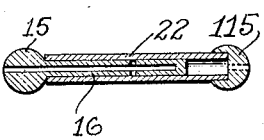
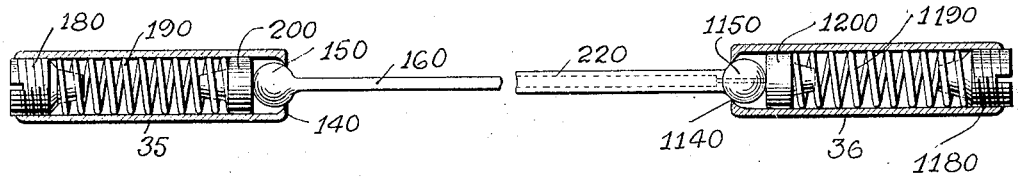
INVENTOR
Augustus S. Meseroll
BY Cooper, Kerr & Dunham
his ATTORNEYS Patented Apr. 2, 1929.

1,707,530

UNITED STATES PATENT OFFICE.

AUGUSTUS STOUT MESEROLL, OF HIGHLAND PARK, NEW JERSEY.

UNIVERSAL COUPLING.

Application filed April 15, 1924. Serial No. 706,622.

This invention relates to universal couplings and has for some of its objects to provide shaft couplings which are efficient in operation, comparatively simple in construction, easy to assemble and connect, and in which renewals and replacements of parts may be readily effected.

Other objects and advantages will appear as the invention is hereinafter disclosed.

Referring to the drawings which illustrate what I now consider preferred forms of the invention:

Fig. 1 is an elevation in section on the line 1—1 of Fig. 2, looking in the direction of the arrows.

Fig. 2 is a section on the line 2—2 of Fig. 1, looking in the direction of the arrows.

Fig. 3 is a view similar to the upper half of the coupling member 10 as shown in Fig. 1, Fig. 3, however, illustrating a modification.

Figs. 4, 5 and 6 are detail sectional views illustrating further modifications.

The coupling may assume various forms within the scope of the appended claims. As shown in Figs. 1 and 2, it comprises the following structure. The coupling member 10 is rotatable about the axis X—X and the coupling member 11 is rotatable about the axis Y—Y. While the two axes of rotation are shown in alignment in Fig. 1, they need not be, but there may be any one of a wide variety of angles between the two axes. For convenience in construction, assembly, and disassembly, the member 10 may be constructed of two parts and joined by screws 12 (Fig. 2). The member 10 may, however, be cast in one piece as shown in Fig. 3. Either of the members 10, 11, may constitute the driving member and the other the driven member of the coupling. The member 10 is provided with a plurality (six in the present case) of ball-receiving recesses 13 each consisting of a bore or cylindrical hole having its axis parallel to the axis X—X and terminating at one end in a ball-receiving socket 14. Balls 15 are each mounted in a corresponding one of the recesses 13 and sockets 14 and are each provided with a rod 16 rigidly secured thereto and projecting through a corresponding one of the openings 17 provided in the face of the member 10. Each bore 13 is shown provided with a screw-threaded portion, at the end opposite the ball-receiving socket, to receive a corresponding one of six plugs 18. Helical compression springs 19 are provided, one in each of the bores 13 and abutting the plug 18 at one end and either directly engaging a ball 15 at its opposite end (Fig. 1) or engaging a sliding plug 20 (Fig. 3), which in turn engages the ball 15, being provided with a ball-engaging socket portion 21 for this purpose. In either event, the springs 19 urge or bias the ball 15 toward their seats 14 but permit any one or more of the balls to move rearwardly in the bore or bores 13 when sufficient pressure is exerted to overcome the spring pressure in that bore or those bores. Obviously, by turning the plugs 18 in one direction or the other, the pressure exerted by each of the springs 19 may be adjusted or regulated.

Except for one difference, the member 11 is substantially identical to the member 10, the reference numerals 113, 114, 115, 117, 118, and 119, applied to the member 11 designated parts identical to those designated by the reference numerals 13, 14, 15, 17, 18, and 19, applied to the member 10 and described above. If desirable the member 11 may be cast in one piece and provided with plugs such as the plugs 20 described above in connection with the member 10. It will be noted that, whereas the balls 15 of the member 10 are provided with rods 16, the balls 115 of the member 11 are each provided with a sleeve 22 rigidly secured thereto and adapted to receive a corresponding one of the rods 16. Each rod cooperates with the sleeve 22 which receives it to form a sliding, telescopic, torque-transmitting coupling between a corresponding pair of the balls 15 and 115. Each of these telescopic connections extends when the corresponding balls are separated or moved away from each other from the relative position indicated in Fig. 1, and returns to the position illustrated in Fig. 1 when the balls move toward each other. Furthermore, when the members 10 and 11 cause any sleeve 22 to engage a ball 15, separating movement of the balls in their recesses 13 and 113 is permitted by the springs 19 and 119. It will further be appreciated that, by virtue of the structure described above, including the clearance openings 17 and 117, each of the rods 16 is pivoted for universal movement with respect to the member 10 to which it is connected, and each of the sleeves 22 is pivoted for universal movement with respect to the member 11 to which it is connected. By virtue of this construction rotation of either of the members 10 and 11 will transmit torque to and cause rotation of the other of said members even though the axes of rotation X—X and Y—Y of the two members are not in alignment.

If desirable a helical compression spring 25 may be provided on each of the sleeves 22 so as to abut at its opposite ends the adjacent faces of the members 10 and 11. Furthermore, each of the members 10 and 11 may be keyed or otherwise secured to a corresponding one of the shafts 26 and 27.

The operation of the form of invention illustrated will be readily understood in view of the foregoing description. Assume that the shaft 26 is driven by a motor, that the shaft 27 is connected to a load, and that the axes of rotation X—X and Y—Y are at an angle to each other. Torque is transmitted from the member 10 (in this case the driving member) to the member 11 (in this case the driven member) through the telescopic connections 16—22 reinforced by the springs 25. As portions of the adjacent faces of the members 10 and 11 approach and recede, the elements 16 and 22 slide with respect to each other and the balls 15, 115 are permitted to move in the bores 13 and 113, if this movement is necessary. The coupling is therefore operative to transmit torque when the axes X—X and Y—Y are in alignment and also when they are not in alignment. In short, the coupling is a universal coupling.

As actually constructed for service the adjacent faces of members 10 and 11 are very close together, being only far enough apart to permit shafts 26 and 27 to be slightly out of alignment without causing 10 and 11 to contact at their near edges. In operation the driving disk assumes a position of rotation slightly in advance of the driven disk, the latter being pulled along by the driving disk through the instrumentality of the rods 16 and sleeves 22 which are under shearing strain and which are inclined in the direction of rotation to the slight extent permitted by the sockets at their ends. If the shafts are out of line, rods 16 and sleeves 22 constantly reciprocate relatively to each other as the distance varies between the faces of disks 10 and 11.

In assembling the parts, the following procedure may be adopted. Assume first that the members 10 and 11 are each cast in one piece (see Fig. 3). The balls 15 are each inserted into the bores 13, from the threaded ends of the latter, so that the rods 16 will project through the openings 17. If the members 20 are employed, they are next inserted into the bores 13 from the threaded ends of the latter. The springs 19 are next inserted in the bores 13 and the plugs 18 screwed home to the desired position. If the member 10 is made in two parts (see Figs. 1 and 2) the balls 15, springs 19, and sliding plugs 20, if the latter are employed, may be inserted in proper sequence through the unthreaded ends of the bores 13 and the parts of the member 10 may then be connected by the screws 12. The member 11 and associated parts may be assembled as described above in connection with the member 10. The springs 25 may now be placed on the sleeves 22 and each of the rods 16 inserted into a corresponding one of the sleeves. Obviously disassembly may be accomplished by performing the above described operations in reversed sequence. Access to any set of parts contained in a bore 13 or 113 may be readily had by unscrewing the plug 18 or 118 of that bore.

In addition to the variations above noted, further modifications may be resorted to. In Fig. 4 the elements 140, 150, 160, 180, 190, and 200 correspond to the elements 14, 15, 16, 18, 19, and 20, respectively, of the preceding figures. In Fig. 4, the elements 150, 180, 190, and 200 are mounted in a steel cage or sleeve 35 in turn rigidly secured within a suitable bore, such as the bore 13, of the member 10. Cages 36 (Fig. 5), similar to the cages 35, may be secured within suitable bores in the member 11. In Fig. 5, the parts 1140, 1150, 1180, 1190, 1200, and 220, correspond to the parts 114, 115, 118, 119, 20, and 22 of Figs. 1, 2 and 3, and therefore need no further description.

For purposes of lubrication the ball-receiving sockets or chambers may be supplied with oil or grease. In order to supply or feed lubricant to the sliding surfaces of the rods and sleeves, a construction such as that shown in Fig. 6 may be adopted, in which the ball 15 and its rod 16 is provided with an axial bore or lubricant duct. This lubricant bore or duct communicates at one end with the chamber which contains the ball 15 and at its other end, through one or more radial outlets, with the exterior of the rod 16 and interior of the sleeve 22. Grease or lubricant within the said chamber of the ball 15 may be forced or fed through the bore of the ball 15 and rod 16 to the exterior of the rod 16 and interior of the sleeve 22, effectively lubricating the relatively sliding surfaces of these members. Obviously, each of the sets of relatively sliding rods and sleeves may be provided with this lubricating feature.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use. If desirable, the lubricating or oil duct may be provided only on the sleeve end as shown in dotted lines in Fig. 6.

What I claim is:—

1. A universal coupling comprising in combination, a rotatable driving member, a rotatable driven member, a plurality of power transmitting elements pivotally connected to said driving member, and a plurality of power transmitting elements pivotally connected to said driven member, each of the elements of one member being in telescopic engagement with a corresponding one of the elements of the other member, one of the elements of each pair of telscoping elements being provided with a longitudinally extending duct through which lubricant is adapted to be fed from the member to which said element is connected.

2. A universal coupling comprising in combination, a rotatable driving member, a rotatable driven member, a plurality of power transmitting elements pivotally connected to said driving member, and a plurality of power transmitting elements pivotally connected to said driven member, each of the elements of one member being in telescopic engagement with a corresponding one of the elements of the other member, one of the elements of each pair of telescoping elements surrounding a portion of the other element of that pair of elements, the inner one of the elements of each pair being provided with a longitudinally extending duct through which lubricant is adapted to be fed from the member to which said inner one of the elements is connected.

3. A universal coupling comprising in combination, a rotatable driving member provided with a plurality of ball-receiving recesses each of which extends in a direction parallel to the axis of rotation of said driving member and terminates in a ball-receiving socket at one end, a ball mounted in each of said recesses, a compression spring mounted in each of said recesses for resiliently pressing the ball in that recess toward its socket, a rotatable driven member provided with a plurality of ball-receiving recesses each of which extends in a direction parallel to the axis of rotation of said driven member and terminates in a ball-receiving socket at one end, a ball mounted in each of said last-mentioned recesses, a compression spring mounted in each of the last-mentioned recesses for resiliently pressing the ball in that recess toward its sockets, the balls in each of said members being resiliently movable in a direction away from the other member, and a plurality of telescopic torque-transmitting connections, each connecting a ball of one member to a corresponding ball of the other member.

In testimony whereof I hereto affix my signature.

AUGUSTUS STOUT MESEROLL.